US012662007B2

(12) United States Patent
Liao et al.

(10) Patent No.: US 12,662,007 B2
(45) Date of Patent: Jun. 23, 2026

(54) POWER INTEGRATION SYSTEM WITH MOTOR DRIVE AND BATTERY CHARGING AND DISCHARGING FUNCTION

(71) Applicant: DELTA ELECTRONICS, INC., Taoyuan City (TW)

(72) Inventors: Chih-Chia Liao, Taoyuan City (TW); Cheng-Chung Li, Taoyuan City (TW); Wen-Chieh Tsai, Taoyuan City (TW); Hsieh-Hsiung Cheng, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 881 days.

(21) Appl. No.: 17/981,605

(22) Filed: Nov. 7, 2022

(65) Prior Publication Data

US 2023/0145202 A1 May 11, 2023

Related U.S. Application Data

(60) Provisional application No. 63/276,866, filed on Nov. 8, 2021.

(30) Foreign Application Priority Data

Sep. 21, 2022 (TW) .................................. 111135642

(51) Int. Cl.
| | |
|---|---|
| *B60L 53/22* | (2019.01) |
| *B60L 53/10* | (2019.01) |
| *H02P 27/06* | (2006.01) |

(52) U.S. Cl.
CPC ............... *B60L 53/22* (2019.02); *B60L 53/11* (2019.02); *H02P 27/06* (2013.01); *B60L 2210/12* (2013.01)

(58) Field of Classification Search
USPC .......................................................... 320/128
See application file for complete search history.

(56) References Cited

U.S. PATENT DOCUMENTS

| | | | |
|---|---|---|---|
| 2007/0247123 A1 | 10/2007 | Bocchiola | |
| 2012/0019231 A1 | 1/2012 | Chen | |

(Continued)

FOREIGN PATENT DOCUMENTS

| | | |
|---|---|---|
| CN | 111347925 A | 6/2020 |
| EP | 2450222 A2 | 5/2012 |

(Continued)

OTHER PUBLICATIONS

Office Action dated Feb. 29, 2024 of the relating U.S. Appl. No. 17/981,579.

(Continued)

*Primary Examiner* — Mohammed Alam
(74) *Attorney, Agent, or Firm* — MUNCY, GEISSLER, OLDS & LOWE, P.C.

(57) ABSTRACT

A power integration system with motor drive and battery charging and discharging function includes a motor, a power integration circuit, and a battery. The motor includes multi-phase paths, and each path has an inductor. The power integration circuit includes an inverter and a charger. The inverter includes multi-phase bridge arms, each bridge arm has an upper switch and a lower switch, and each bridge is correspondingly coupled to each inductor of the motor. The charger a switch, the upper switch and the lower switch of at least one bridge arm of the shared inverter, and the inductor of the shared motor. The switch is coupled between any two bridge arms. The power integration circuit receives a DC power provided by a DC power apparatus, and the (Continued)

charger converts the DC power to charge the battery, and the battery provides power required to drive the motor through the inverter.

8 Claims, 13 Drawing Sheets

(56) References Cited

U.S. PATENT DOCUMENTS

| | | | |
|---|---|---|---|
| 2012/0112702 A1 | 5/2012 | Steigerwald et al. | |
| 2013/0234675 A1 | 9/2013 | King et al. | |
| 2014/0232301 A1 | 8/2014 | Dittmer et al. | |
| 2016/0241185 A1 | 8/2016 | Esnault | |
| 2017/0297612 A1 | 10/2017 | Uryu et al. | |
| 2018/0056793 A1* | 3/2018 | Rozman | B60L 50/13 |
| 2018/0287601 A1* | 10/2018 | Yang | H03K 17/041 |
| 2019/0023136 A1* | 1/2019 | Lee | H02J 7/02 |
| 2019/0255953 A1* | 8/2019 | Conlon | H02J 7/00036 |
| 2020/0153362 A1 | 5/2020 | Xu et al. | |
| 2020/0252020 A1 | 8/2020 | Ge et al. | |
| 2020/0298722 A1* | 9/2020 | Smolenaers | H02J 7/345 |
| 2021/0091573 A1* | 3/2021 | Takamatsu | H02J 7/007 |
| 2021/0408889 A1 | 12/2021 | Zhu et al. | |
| 2022/0194239 A1 | 6/2022 | Zhu | |
| 2022/0329096 A1 | 10/2022 | Wang et al. | |

FOREIGN PATENT DOCUMENTS

| | | |
|---|---|---|
| JP | H06133564 A | 5/1994 |
| JP | 2014158344 A | 8/2014 |
| JP | 2014524731 A | 9/2014 |
| JP | 2017135785 A | 8/2017 |
| KR | 20120114852 A | 10/2012 |
| KR | 20120125886 A | 11/2012 |
| TW | 201119907 A | 6/2011 |
| TW | 201517490 A | 5/2015 |
| WO | 2018034007 A1 | 2/2018 |
| WO | 2021079920 A1 | 4/2021 |
| WO | 2021176431 A1 | 9/2021 |

OTHER PUBLICATIONS

Office Action dated Jul. 2, 2025 of the relating U.S. Appl. No. 17/981,560.

Office Action dated Sep. 7, 2023 of the corresponding Taiwan patent application No. 111135642.

Office Action dated Sep. 28, 2023 of the corresponding Japan patent application No. 2022-178394.

Search Report dated Jun. 22, 2023 of the corresponding European patent application No. 22205736.6.

Office Action dated Sep. 28, 2023 of the corresponding Japan patent application No. 2022-178334.

Search Report dated Jun. 22, 2023 of the corresponding European patent application No. 22205738.2.

Pei-Heng Yi, "Design and Implementation of An Integrated Battery Charger," National Taiwan University of Science and Technology, Jul. 22, 2014, https://hdl.handle.net/11296/8q9uz6, Chapters 4.2-4.4; Fig. 4.1.

Office Action dated Apr. 11, 2023 of the corresponding Taiwan patent application No. 111135647.

Office Action dated Mar. 13, 2023 of the corresponding Taiwan patent application No. 111135643.

Search Report dated Mar. 27, 2023 of the corresponding European patent application No. 22205737.4.

Office Action dated Feb. 23, 2023 of the corresponding Taiwan patent application No. 111135642.

Office Action dated Mar. 28, 2025 of the relating U.S. Appl. No. 17/981,579.

* cited by examiner

POWER INTEGRATION SYSTEM WITH MOTOR DRIVE AND BATTERY CHARGING AND DISCHARGING FUNCTION

CROSS-REFERENCE TO RELATED APPLICATION

This patent application claims the benefit of U.S. Provisional Patent Application No. 63/276,866, filed Nov. 8, 2021, which is incorporated by reference herein.

BACKGROUND

Technical Field

The present disclosure relates to a power integration system, and more particularly to a power integration system with motor drive and battery charging and discharging function.

Description of Related Art

The statements in this section merely provide background information related to the present disclosure and do not necessarily constitute prior art.

The current light electric vehicle system includes a motor driver and a charger, wherein the charger is divided into the on-board charger and the off-board charger. Since the chargers have different battery specifications, various manufacturers will introduce dedicated off-board chargers for users to use, and the disadvantage is that the chargers are not compatible with different vehicles, which makes it inconvenient to carry.

SUMMARY

An objective of the present disclosure is to provide a power integration system with motor drive and battery charging and discharging function to solve the problems of existing technology.

In order to achieve the above-mentioned objective, the power integration system with motor drive and battery charging and discharging function includes a motor, a power integration circuit, and a battery. The motor includes multi-phase paths, and each path includes an inductor. The power integration circuit includes an inverter and a charger. The inverter includes multi-phase bridge arms, each bridge arm includes an upper switch and a lower switch, and each bridge is correspondingly coupled to each inductor of the motor. The charger includes a switch, the upper switch and the lower switch of at least one bridge arm of the shared inverter, and the inductor of the shared motor. The switch is coupled between any two bridge arms. The battery is coupled to the power integration circuit. The power integration circuit receives a DC power provided by a DC power apparatus, and the charger converts the DC power to charge the battery, and the battery provides power required to drive the motor through the inverter.

Accordingly, the power integration system with motor drive and battery charging and discharging function is provided to realize the structure that the power switches of a three-phase motor driver are shared in the charger, which can reduce the number of external components, thereby reducing the size and achieving high efficiency.

Another objective of the present disclosure is to provide a power integration system with motor drive and battery charging and discharging function to solve the problems of existing technology.

In order to achieve the above-mentioned objective, the power integration system with motor drive and battery charging and discharging function includes a motor, a power integration circuit, and a battery. The motor includes multi-phase paths, and each path includes an inductor. The power integration circuit includes an inverter and a charger. The inverter includes multi-phase bridge arms, each bridge arm has an upper switch and a lower switch, and each bridge is correspondingly coupled to each inductor of the motor. The charger includes a switch, the upper switch and the lower switch of at least one bridge arm of the shared inverter, and the inductor of the shared motor. The battery is coupled to the power integration circuit. The power integration circuit receives a DC power provided by a DC power apparatus, and the charger converts the DC power to charge the battery, and the battery provides power required to drive the motor through the inverter. The switch is coupled between any one inductor and the DC power apparatus.

Accordingly, the power integration system with motor drive and battery charging and discharging function is provided to realize the structure that the power switches of a three-phase motor driver are shared in the charger, which can reduce the number of external components, thereby reducing the size and achieving high efficiency.

Further another objective of the present disclosure is to provide a power integration system with motor drive and battery charging and discharging function to solve the problems of existing technology.

In order to achieve the above-mentioned objective, the power integration system with motor drive and battery charging and discharging function includes a motor, a power integration circuit, and a battery. The motor includes multi-phase paths, and each path includes an inductor. The power integration circuit includes an inverter and a charger. The inverter includes multi-phase bridge arms, each bridge arm has an upper switch and a lower switch, and each bridge is correspondingly coupled to each inductor of the motor. The charger includes a switch, a sub path, the upper switch and the lower switch of at least one bridge arm of the shared inverter, and the inductor of the shared motor. The switch is coupled between any one bridge arm and the corresponding inductor. The battery is coupled to the power integration circuit. The power integration circuit receives a DC power provided by a DC power apparatus, and the charger converts the DC power to charge the battery, and the battery provides power required to drive the motor through the inverter.

Accordingly, the power integration system with motor drive and battery charging and discharging function is provided to realize the structure that the power switches of a three-phase motor driver are shared in the charger, which can reduce the number of external components, thereby reducing the size and achieving high efficiency.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
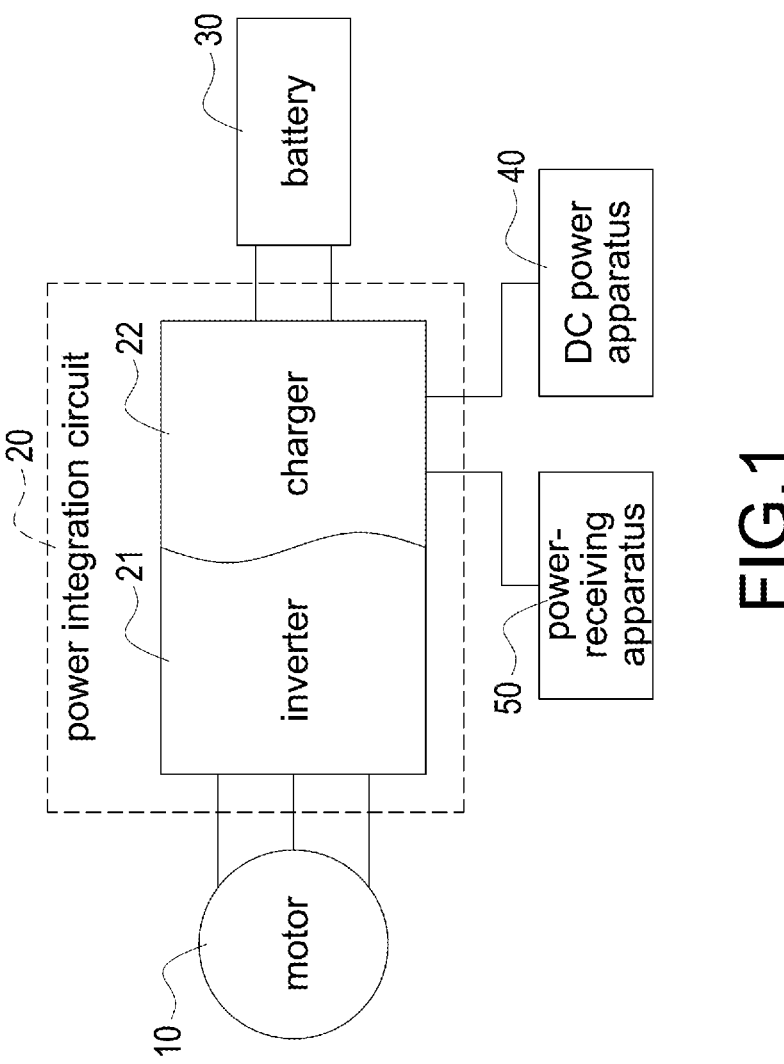
FIG. 1 is a block diagram of the power integration system with motor drive and battery charging and discharging function used with the DC power apparatus according to the present disclosure.

Reference will now be made to the drawing figures to describe the present disclosure in detail. It will be understood that the drawing figures and exemplified embodiments of present disclosure are not limited to the details thereof.

Due to the versatility of Type-C transmission cables and the convenience of USB-PD chargers, the present disclosure proposes an integrated (shared components) bidirectional charger structure as shown in FIG. 1, which combines the traditional three-phase motor driver and charger to form an integration system. The system can be directly connected to an external USB-PD through a Type-C transmission cable for charging. In addition to the charging function, the battery energy can also be provided to external apparatuses (or power-receiving apparatuses) through Type-C transmission cables, such as but not limited to light electric vehicles (such as electric scooters, electric bicycles, electric wheelchairs, electric skateboards, etc.). Accordingly, the power integration system with motor drive and battery charging and discharging function is provided to realize the structure that the power switches of a three-phase motor driver are shared in the charger, which can reduce the number of external components, thereby reducing the size and achieving high efficiency.

Please refer to FIG. 1, which shows a block diagram of the power integration system with motor drive and battery charging and discharging function used with the DC power apparatus according to the present disclosure. The power integration system with motor drive and battery charging and discharging function (hereinafter referred to as the power integration system) includes a motor 10, a power integration circuit 20, and a battery 30. The power integration circuit 20 includes an inverter 21 and a charger 22. The inverter 21 has multi-phase (for example, three-phase) bridge arms, each phase bridge arm includes an upper switch and a lower switch, and each phase bridge arm is correspondingly coupled to each phase winding of the motor. As shown in FIG. 1, three-phase paths of the motor 10 are a U-phase path, a V-phase path, and a W-phase path, respectively. The U-phase path is coupled to a U-phase inductor $L_1$ of the motor 10, the V-phase path is coupled to a V-phase inductor $L_2$ of the motor 10, and the W-phase path is coupled to a W-phase inductor $L_3$ of the motor 10. The charger 22 includes a switch SW, the upper switch and the lower switch of at least one bridge arm of the shared inverter 21, and the shared phase inductors $L_1$, $L_2$, $L_3$. In other words, the power integration circuit 20 is a shared-component circuit structure having the inverter 21 and the charger 22. Specifically, the part of the shared component is the switch SW, the upper switch and the lower switch of the at least one bridge arm, and the phase inductors $L_1$, $L_2$, $L_3$. Incidentally, the DC power converter of the present invention can be, for example but not limited to, a boost converter, a buck converter, a buck-boost converter, or other types of DC-DC converters, which can be designed according to the requirements of practical applications. The battery 30 is coupled to the power integration circuit 20.

The power integration system shown in FIG. 1 is a bidirectional structure. Therefore, the power integration circuit 20 receives DC power provided by a DC power apparatus 40, and the charger 22 of the power integration circuit 20 converts the DC power to charge the battery 30 so that the DC power can charge the battery 30. In one embodiment, the DC power apparatus 40 is, for example, but not limited to, USB-PD. Take the light electric vehicle— electric bicycle as an example, the motor 10, the power integration circuit 20, and the battery 30 are installed (disposed) inside the electric bicycle, and the DC power provided by the DC power apparatus 40 is an external USB-PD DC power. Therefore, when the electric bicycle is plugged into the USB-PD DC power for charging, the charger 22 of the power integration circuit 20 converts the USB-PD DC power to charge the battery 30 installed inside the vehicle body of the electric bicycle.

Moreover, the battery 30 provides power required by a power-receiving apparatus 50 through the charger 22. As mentioned above, the power-receiving apparatus 50 is, for example, but not limited to, a portable mobile apparatus (such as a mobile phone, a tablet computer, a notebook computer, etc.). When the user is outdoors, the user can plug a mobile phone, a power bank, or an electric bicycle (i.e., the power-receiving apparatus 50) into the charger 22 of the power integration circuit 20 installed inside another electric bicycle for charging, the battery 30 supplies (provides) the power required by the mobile phone through the charger 22 to charge the mobile phone, the power bank, or the electric bicycle.

Moreover, the battery 30 provides power required to drive the motor 10 through the inverter 21. When the user rides the electric bicycle outdoors, the power required to drive the motor 10 is supplied by the battery 30.

Moreover, the power-receiving apparatus 50 charges the battery 30 through the charger 22. When the electric bicycle is not in the riding state and no DC power (the USB-PD DC power) provided by the DC power apparatus 40 charges the battery 30, the battery 30 is charged by the power provided from the power-receiving apparatus 50 (i.e., the mobile phone, the power bank, or the electric bicycle). For example, when the user rides the electric bicycle outdoors and the battery 30 cannot provide the power required by the electric bicycle, the battery 30 can be charged by the power provided from the power-receiving apparatus 50 so that the electric bicycle can be ridden in a short time to the nearest place with the DC power apparatus 40 to be fully charged.

Therefore, the power integration system shown in FIG. 1 provides a bidirectional power path, including that the DC power apparatus 40 charges the battery 30 or the power-receiving apparatus 50 charging the battery 30, and the battery 30 supplies power to the power-receiving apparatus 50 or the battery 30 supplies power to the motor.

Figure 2A:
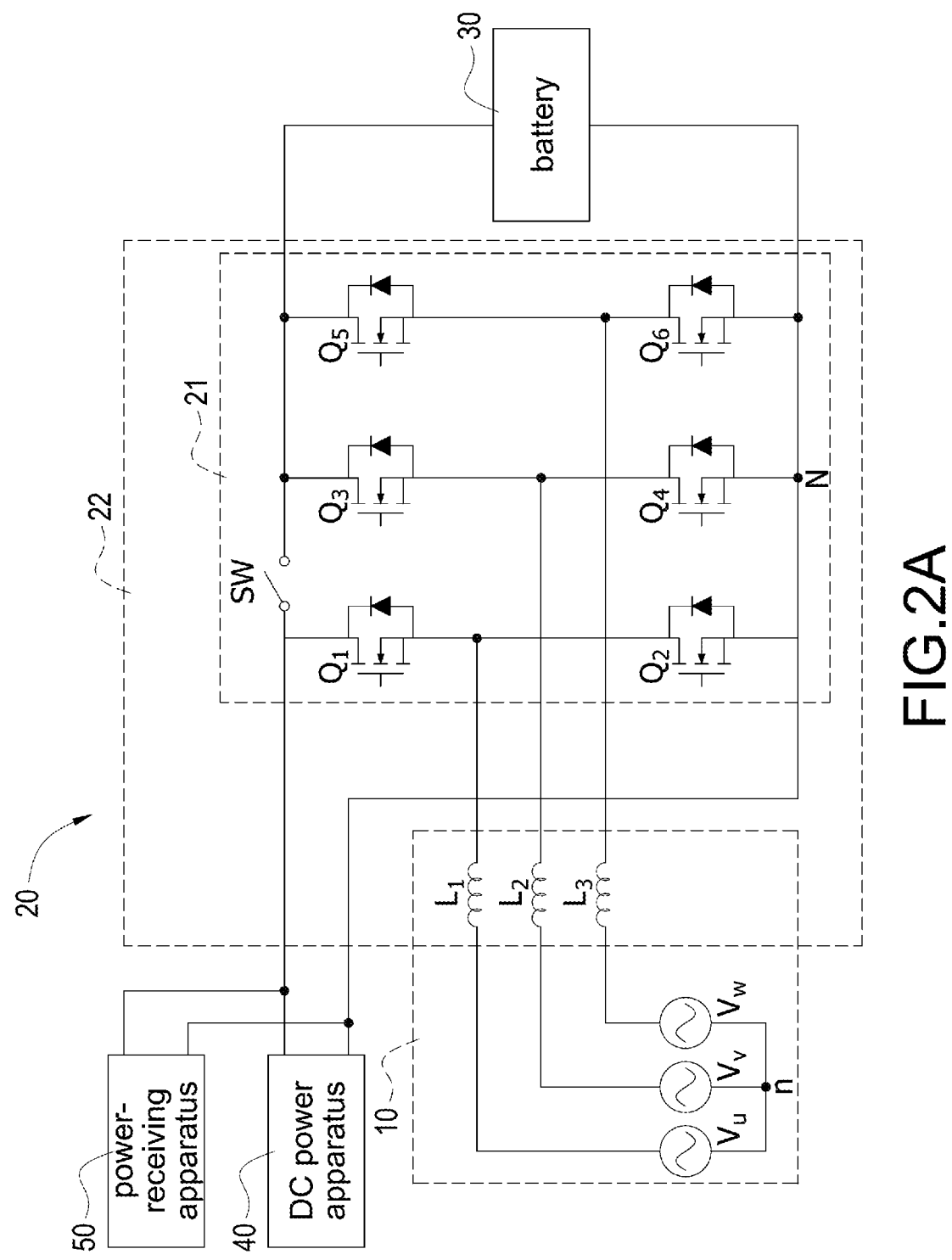
FIG. 2A is a block circuit diagram of a first embodiment of a charger of a power integration circuit without a front-end DC conversion path according to the present disclosure.
Figure 2B:
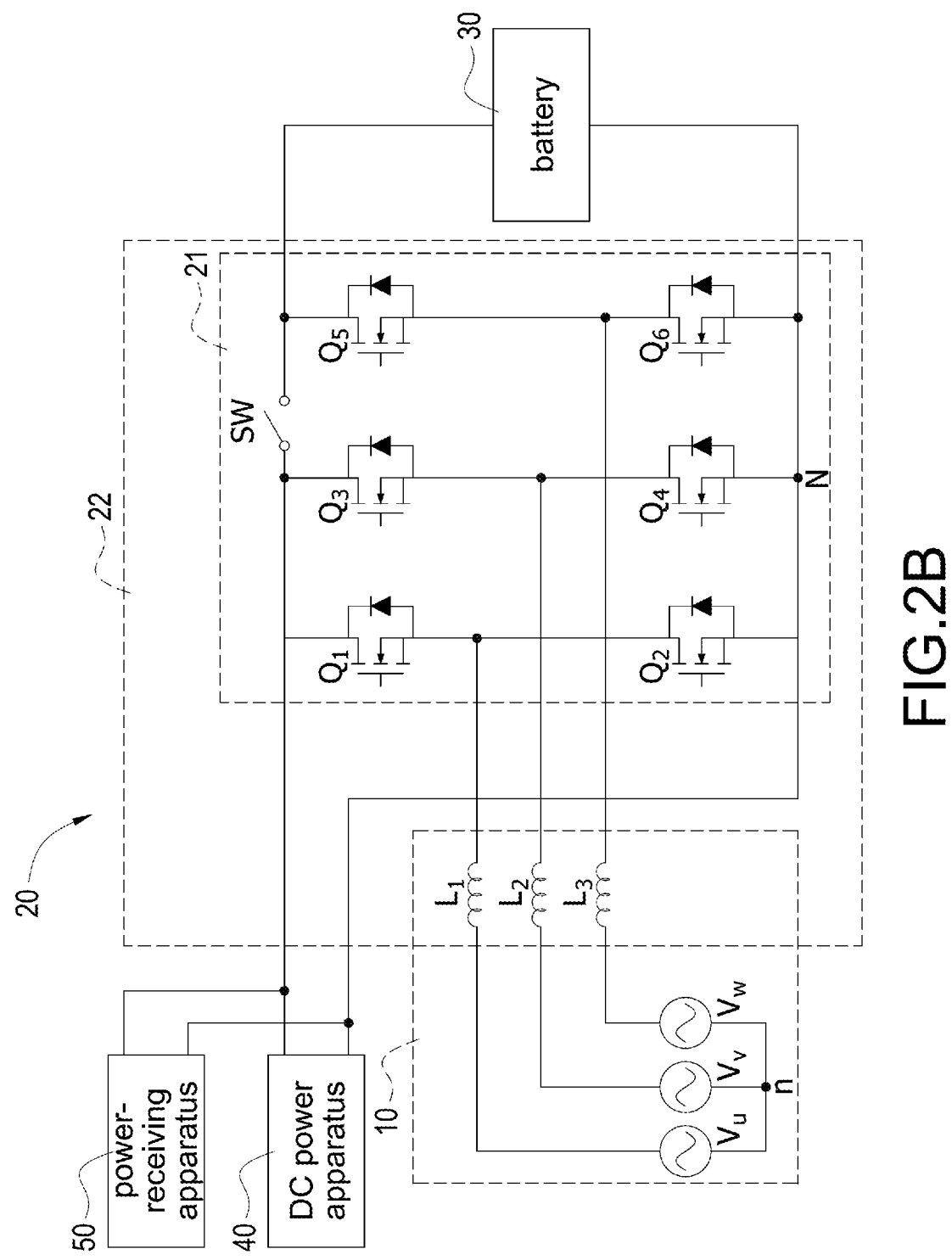
FIG. 2B is a block circuit diagram of a second embodiment of the charger of the power integration circuit without the front-end DC conversion path according to the present disclosure.

Please refer to FIG. 2A and FIG. 2B, which show block circuit diagrams of a first embodiment and a second embodiment of a charger of a power integration circuit without a front-end DC conversion path according to the present disclosure, respectively. As mentioned above, the switch SW is coupled between any two bridge arms. Specifically, as shown in FIG. 2A, the switch SW is coupled between a first bridge arm having the upper switch $Q_1$ and the lower switch $Q_2$ and a second bridge arm having the upper switch $Q_3$ and the lower switch $Q_4$, and therefore the first bridge arm is the shared bridge arm. By turning on or turning off the switch SW, the DC power provided by the DC power apparatus 40 supplies to the power integration circuit 20 through the first inductor $L_1$, and outputs power to the battery 30 to charge the battery 30 through the second inductor $L_2$ and/or the third inductor $L_3$. In other words, in FIG. 2A, the DC power provided from the DC power apparatus 40 is inputted to the shared first bridge arm (before the shared inductors $L_1$), and is outputted from the shared second bridge arm and third bridge arm, or one of the shared second bridge arm and third bridge arm (after the shared inductors $L_2$-$L_3$). Moreover, the battery 30 can provide power from the shared bridge arm(s) (shared inductor(s)), i.e., the second bridge arm and the third bridge arm, or one of the second bridge arm and the third bridge arm to the shared bridge (shared inductor), i.e., the first bridge arm to supply the power-receiving apparatus 50.

Figure 3A:
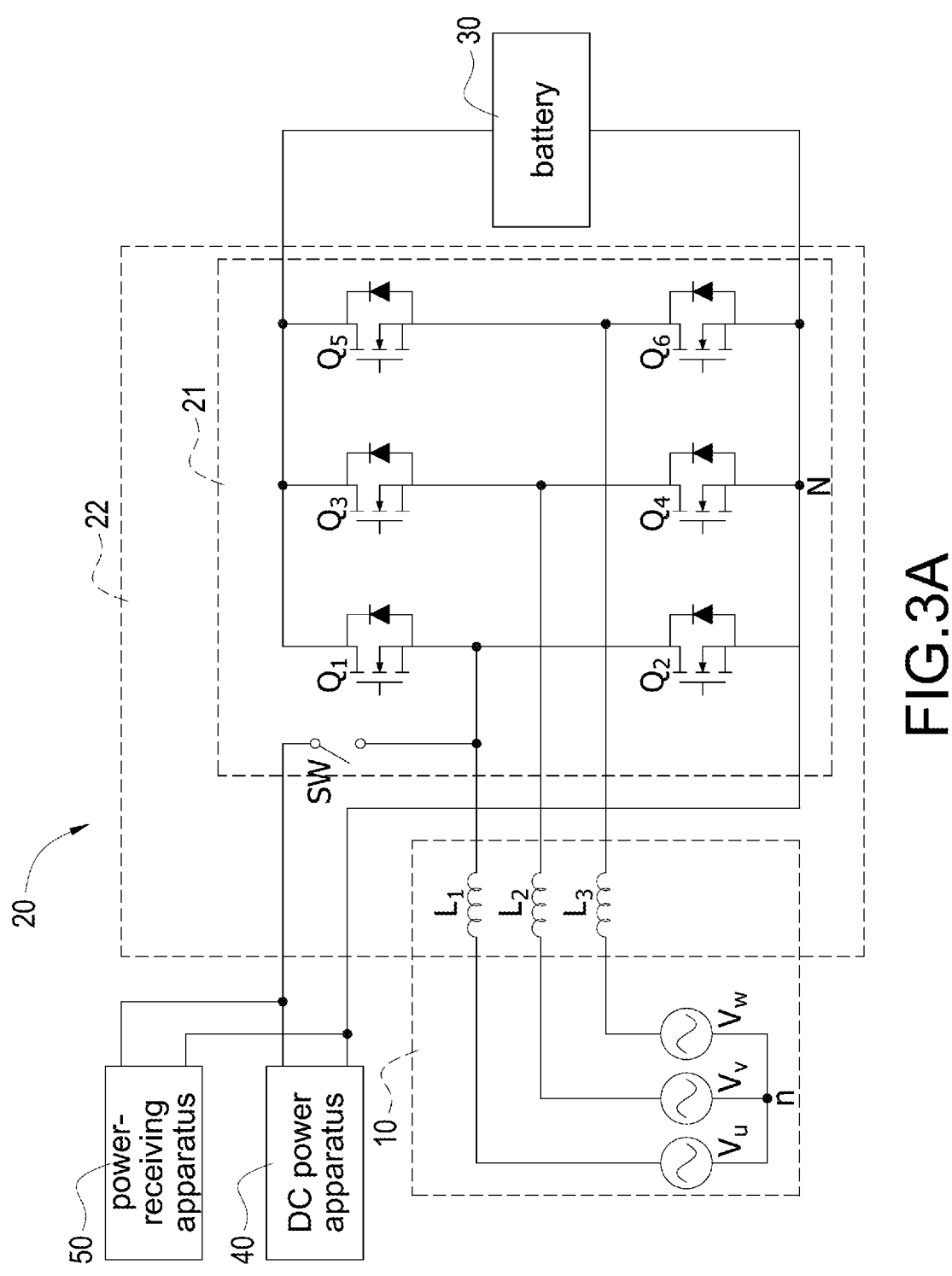
FIG. 3A is a block circuit diagram of a third embodiment of the charger of the power integration circuit without the front-end DC conversion path according to the present disclosure.

The major difference between FIG. 2B and FIG. 2A is that the switch SW is coupled between the second bridge arm having the upper switch $Q_3$ and the lower switch $Q_4$ and a third bridge arm having the upper switch $Q_5$ and the lower switch $Q_6$, and therefore the first bridge arm and the second bridge arm are the shared bridge arms. By turning on or turning off the switch SW, the DC power provided by the DC power apparatus 40 supplies to the power integration circuit 20 through the first inductor $L_1$ and/or the third inductor $L_2$, and outputs power to the battery 30 to charge the battery 30 through the third inductor $L_3$. In other words, in FIG. 2B, the DC power provided from the DC power apparatus 40 is inputted to the shared first bridge arm and second bridge arm, or one of the shared first bridge arm and second bridge arm (before the shared inductors $L_1$-$L_2$), and is outputted from the shared third bridge arm (after the shared inductors $L_3$). Moreover, the battery 30 can provide power from the shared bridge arm (shared inductor), i.e., the third bridge arm to the shared bridge(s) (shared inductor(s)), i.e., the first bridge arm and the second bridge arm, or one of the first bridge arm and the second bridge arm to supply the power-receiving apparatus 50. Please refer to FIG. 3A and FIG. 3B, which show block circuit diagrams of a third embodiment and a fourth embodiment of the charger of the power integration circuit without the front-end DC conversion path according to the present disclosure, respectively. Different from FIG. 2A and FIG. 2B, the switch SW of FIG. 3A is coupled between any one inductor $L_1$, $L_2$, $L_3$ and the DC power apparatus 40. As shown in FIG. 3A, the switch SW is coupled between the first inductor $L_1$ and the DC power apparatus 40. However, in the present disclosure, it is not limited by this position, that is, the switch SW may be coupled between the second inductor $L_2$ and the DC power apparatus 40. As shown in FIG. 3A, the switch SW is coupled between the first inductor $L_1$ and the DC power apparatus 40, or the switch SW is coupled between the third inductor $L_3$ and the DC power apparatus 40. For example, the DC power provided by the DC power apparatus 40 can charge the battery 30 through the shared second bridge arm and the third bridge arm, or one of the second bridge arm and the third bridge arm. Moreover, the battery 30 can provide power to supply the power-receiving apparatus 50 through the shared second bridge arm and the third bridge arm, or one of the second bridge arm and the third bridge arm.

Figure 3B:
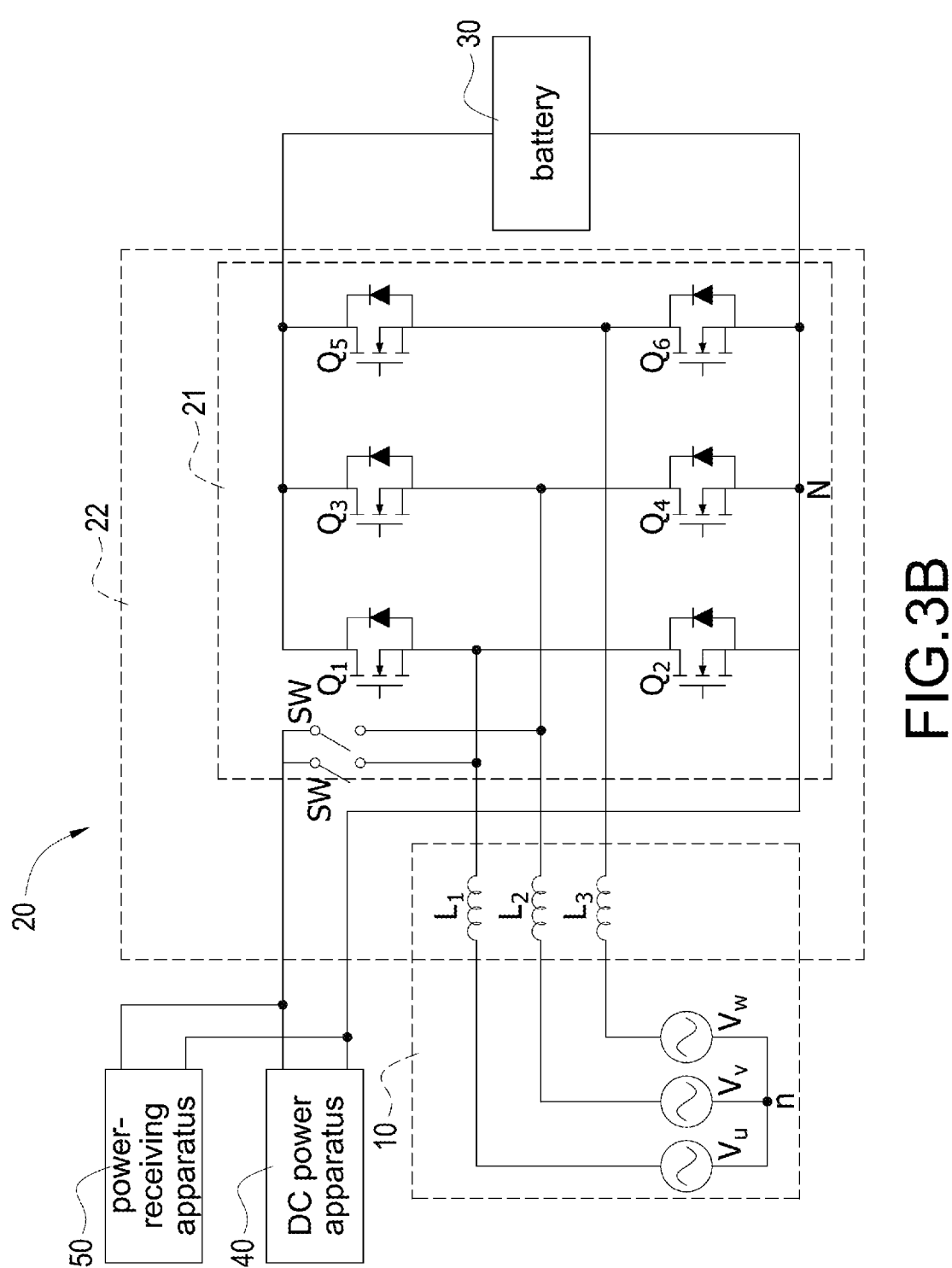
FIG. 3B is a block circuit diagram of a fourth embodiment of the charger of the power integration circuit without the front-end DC conversion path according to the present disclosure.

In another embodiment, the switch SW is coupled between two inductors $L_1$, $L_2$, $L_3$ and the DC power apparatus 40. As shown in FIG. 3B, the switch SW is respectively coupled between the first inductor $L_1$ and the DC power apparatus 40 and between the second inductor $L_2$ and the DC power apparatus 40. However, in the present disclosure, it is not limited by this, that is, the switch SW may be respectively coupled between the second inductor $L_2$ and the DC power apparatus 40 and between the third inductor $L_3$ and the DC power apparatus 40, or the switch SW may be respectively coupled between the first inductor $L_1$ and the DC power apparatus 40 and between the third inductor $L_3$ and the DC power apparatus 40. Therefore, by turning on or turning off the switch SW, the DC power provided by the DC power apparatus 40 supplies to the power integration circuit 20 through the corresponding two inductors $L_1$, $L_2$, $L_3$, and outputs power to the power-receiving apparatus 50 through another inductor $L_1$, $L_2$, $L_3$. For example, the DC power provided by the DC power apparatus 40 can charge the battery 30 through the shared third bridge arm. Moreover, the battery 30 can provide power to supply the power-receiving apparatus 50 through the shared third bridge arm.

Figure 4A:
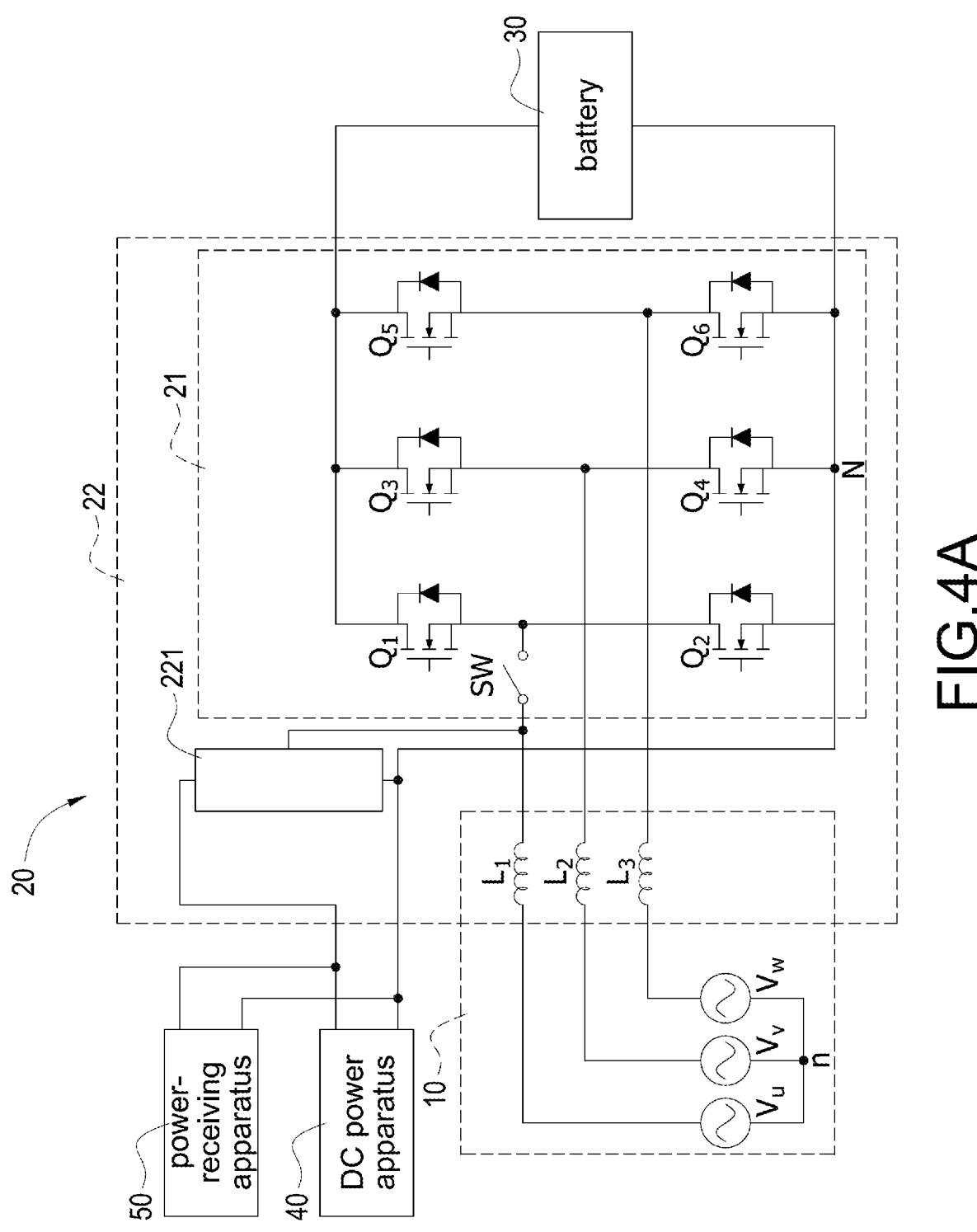
FIG. 4A is a block circuit diagram of a fifth embodiment of the charger of the power integration circuit without the front-end DC conversion path according to the present disclosure.

Please refer to FIG. 4A, which shows a block circuit diagram of a fifth embodiment of the charger of the power integration circuit without the front-end DC conversion path according to the present disclosure. The difference between FIG. 2B, FIG. 2A and FIG. 4A, or between FIG. 3B, FIG. 3A, and FIG. 4A is that the switch SW is coupled between any one bridge arm and the corresponding inductor $L_1$, $L_2$, $L_3$, and the charger 22 further includes a sub path 221. Please refer to FIG. 4B and FIG. 4C, which show block circuit diagrams of FIG. 4A according to a first embodiment and a second embodiment of the present disclosure, respectively.

Figure 4B:
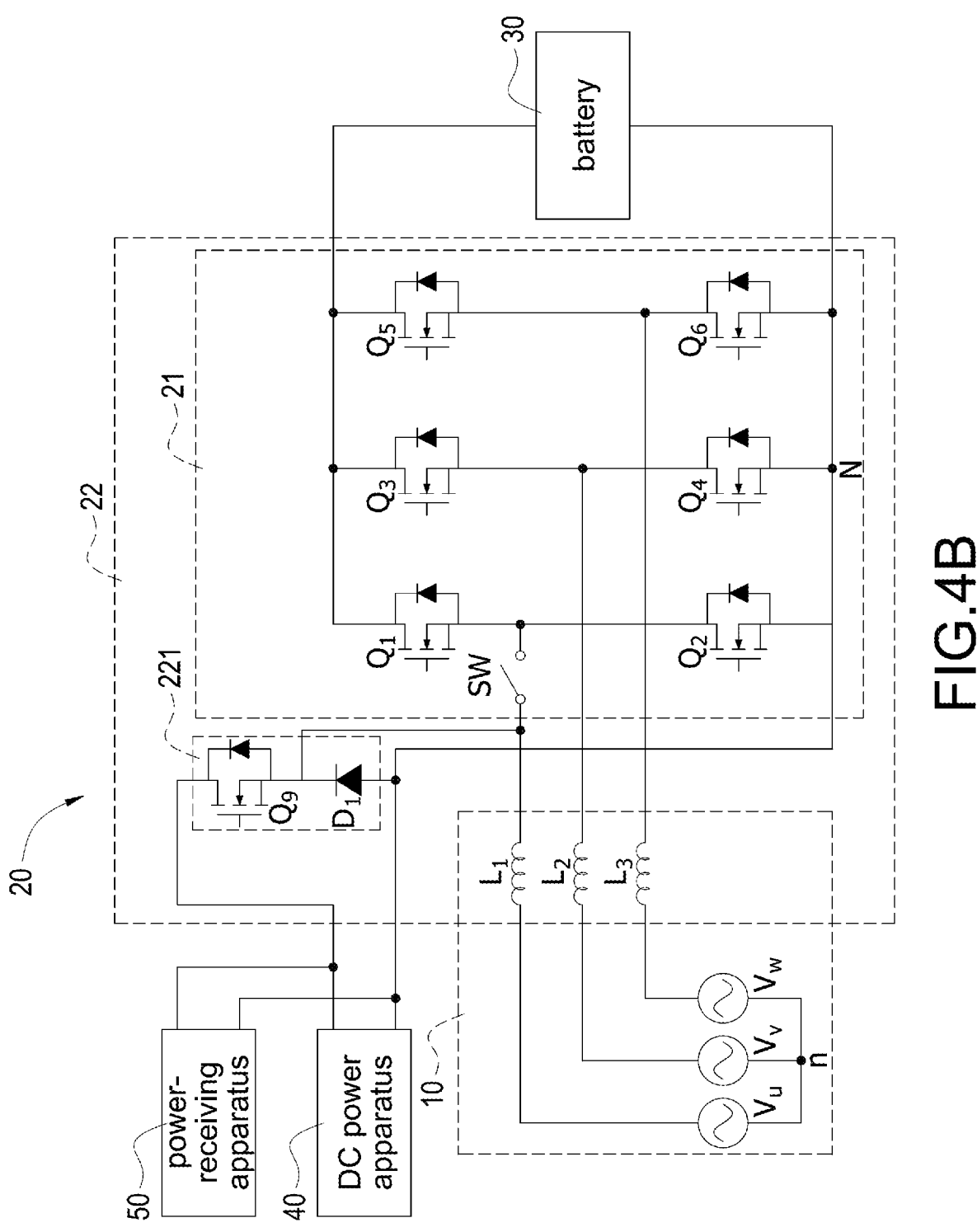
FIG. 4B is a block circuit diagram of FIG. 4A according to a first embodiment of the present disclosure.

As shown in FIG. 4B, the sub path 221 includes a third switch $Q_9$ and a first diode Di. A common-connected node of the third switch $Q_9$ and the first diode Di is coupled to the switch SW and the corresponding inductor $L_1$, $L_2$, $L_3$. In this embodiment, the corresponding inductor $L_1$, $L_2$, $L_3$ is the first inductor $L_1$. However, in the present disclosure, it is not limited by this position, that is, the common-connected node of the third switch $Q_9$ and the first diode Di is coupled to the switch SW and the second inductor $L_2$, or is coupled to the switch SW and the third inductor $L_3$.

Moreover, the first diode Di of the sub path 221 may be replaced by another switch (i.e., a fourth switch), and therefore the common-connected node of the third switch $Q_9$ and the fourth switch is coupled to the switch SW and the corresponding inductor $L_1$, $L_2$, $L_3$.

Figure 4C:
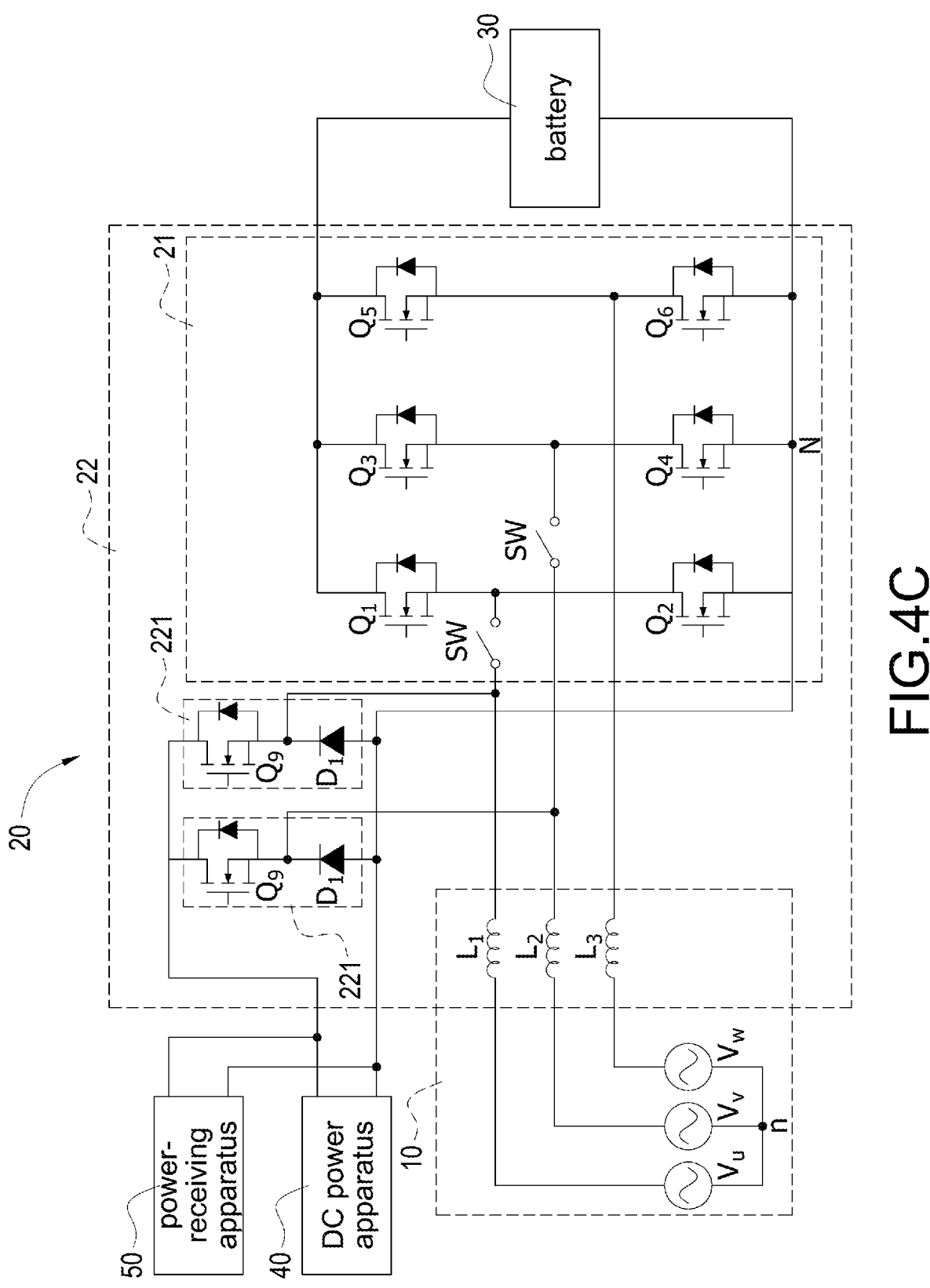
FIG. 4C is a block circuit diagram of FIG. 4A according to a second embodiment of the present disclosure.

As shown in FIG. 4C, the number of switches SW may be plural, and therefore the plurality of switches SW are correspondingly coupled to the inductors $L_1$, $L_2$, $L_3$. Specifically, in the second embodiment shown in FIG. 4C, the number of switches SW is two, and therefore two sub paths 221 are corresponding to the two switches SW. The first sub path 221 is coupled between the DC power apparatus 40 and the first switch SW, and the second sub path 221 is coupled between the DC power apparatus 40 and the second switch SW. The first switch SW is coupled between the first bridge arm, which includes the upper switch $Q_1$ and the lower switch $Q_2$, and the first inductor $L_1$, and the second switch SW is coupled between the second bridge arm, which includes the upper switch $Q_3$ and the lower switch $Q_4$, and the second inductor $L_2$. However, the above-mentioned two sub paths 221 are not limited to be coupled to the first bridge arm and the second bridge arm, that is, the two sub paths 221 may be coupled to any two bridge arms, and the two switches SW are coupled correspondingly between the bridge arms and the inductors $L_1$, $L_2$, $L_3$. Similar operations can be seen in FIG. 4B, and the detail description is omitted here for conciseness.

Figure 5:
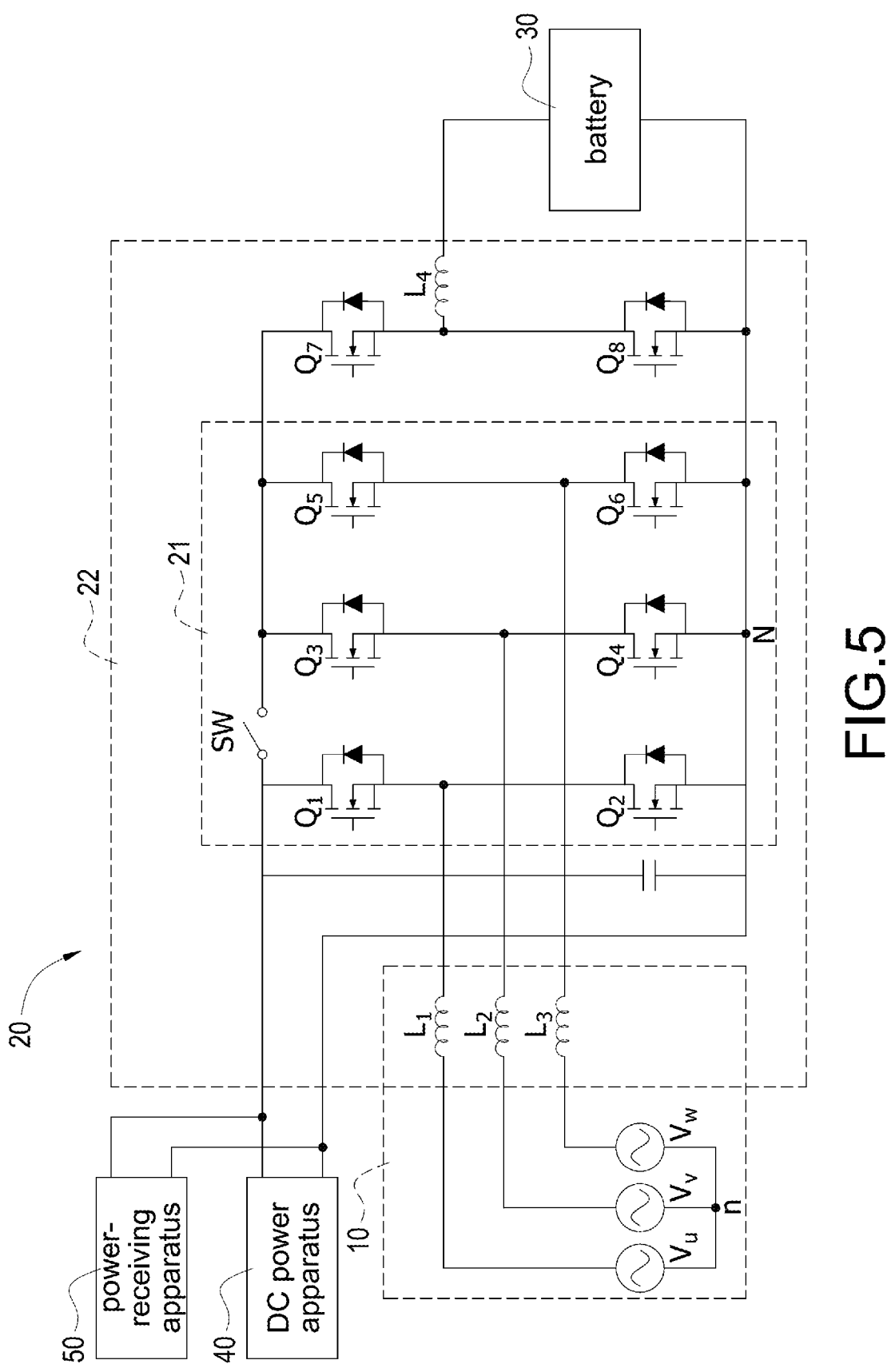
FIG. 5 is a block circuit diagram of a first embodiment of the charger of the power integration circuit with the front-end DC conversion path according to the present disclosure.

Please refer to FIG. 5, which shows a block circuit diagram of a first embodiment of the charger of the power integration circuit with the front-end DC conversion path according to the present disclosure. In comparison with FIG. 2, the charger 22 further includes a front-end DC conversion path. The front-end DC conversion path is coupled to the shared upper switch $Q_5$ and lower switch $Q_6$.

Figure 6:
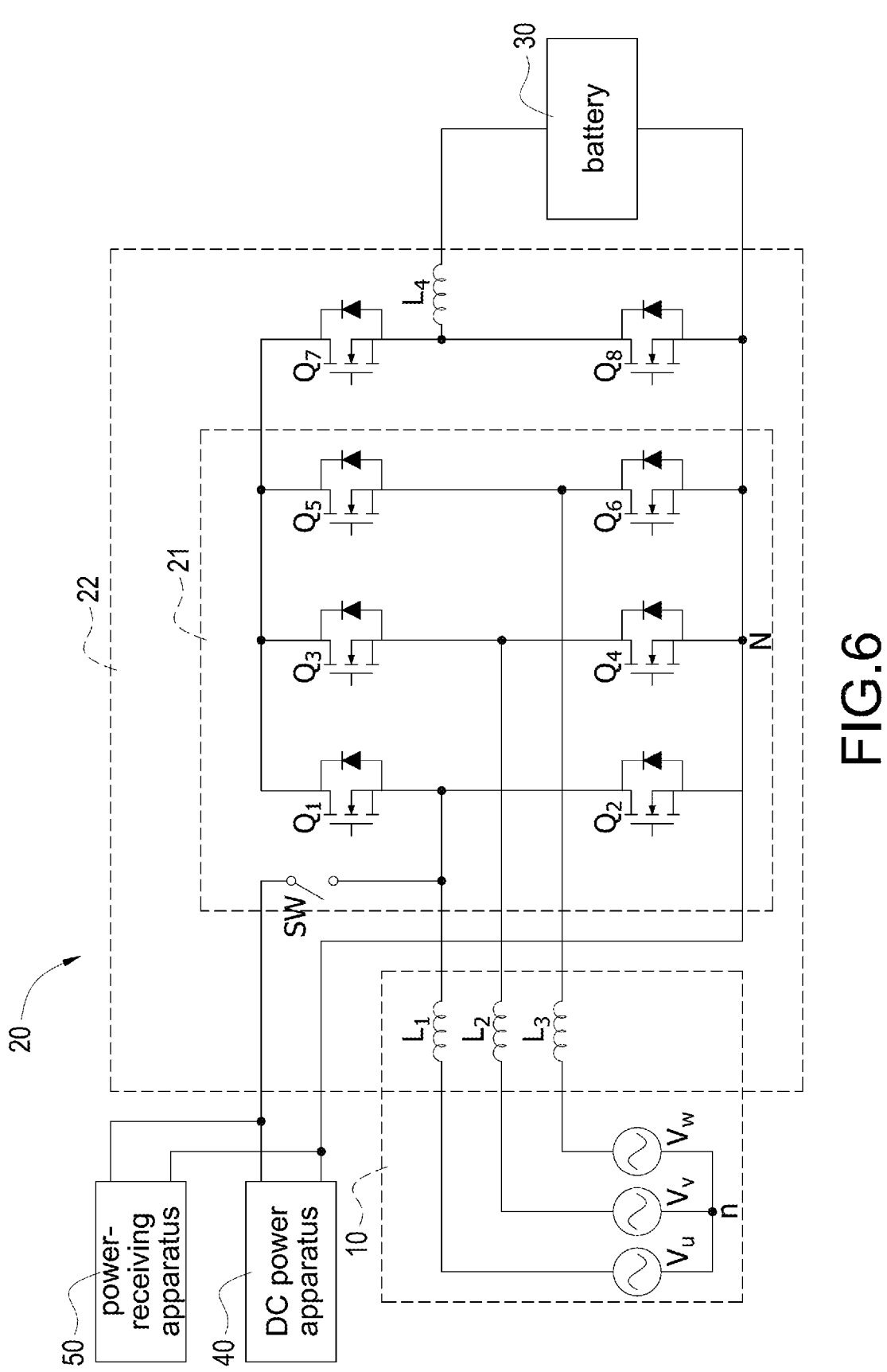
FIG. 6 is a block circuit diagram of a second embodiment of the charger of the power integration circuit with the front-end DC conversion path according to the present disclosure.
Figure 7A:
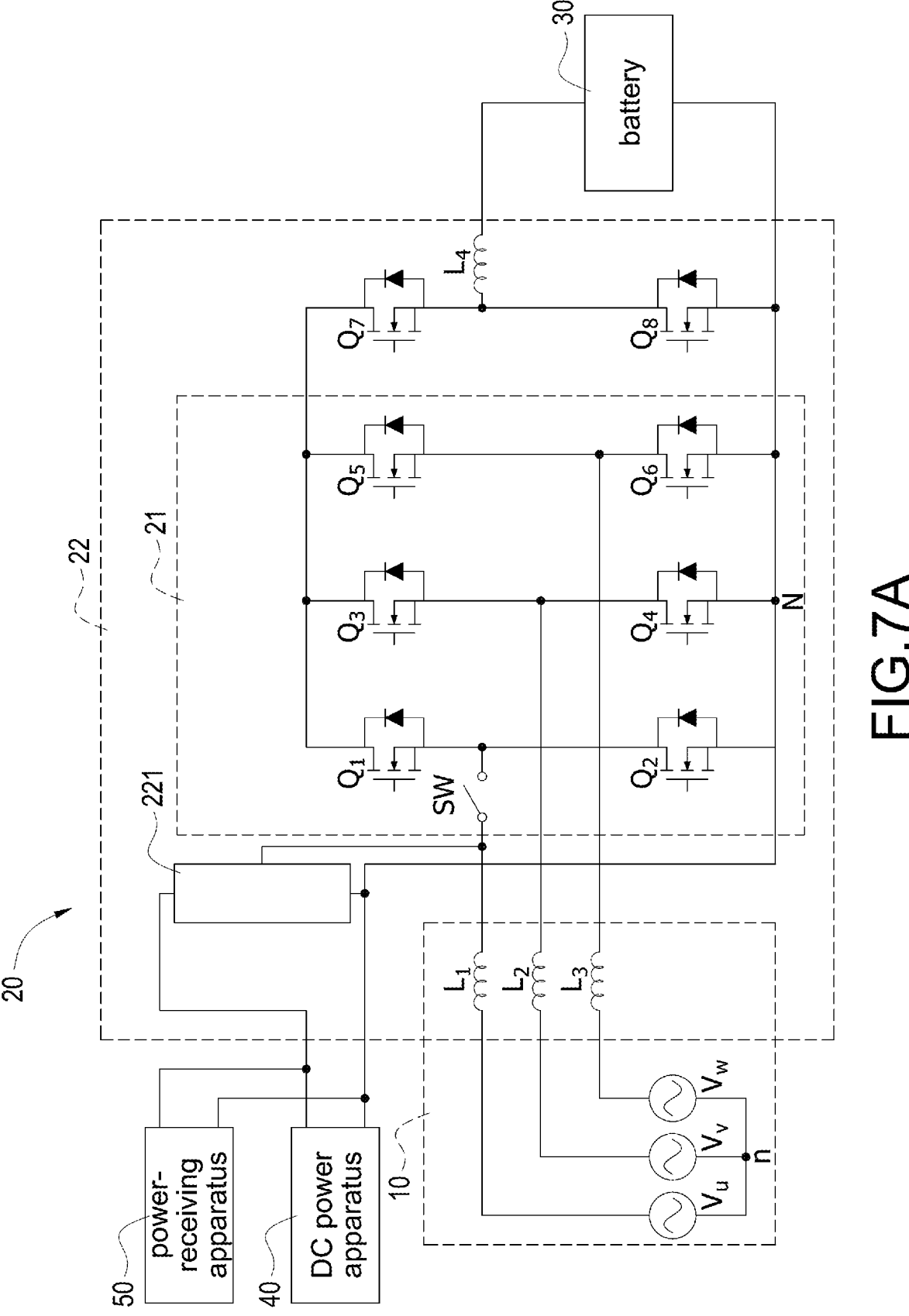
FIG. 7A is a block circuit diagram of a third embodiment of the charger of the power integration circuit with the front-end DC conversion path according to the present disclosure.

Similarly, in comparison with FIG. 3, the charger 22 shown in FIG. 6 further includes a front-end DC conversion path. The front-end DC conversion path is coupled to the shared upper switch $Q_5$ and lower switch $Q_6$. Similarly, in comparison with FIG. 4A, the charger 22 shown in FIG. 7A further includes a front-end DC conversion path. The front-end DC conversion path is coupled to the shared upper switch $Q_5$ and lower switch $Q_6$.

As shown in FIG. 5, FIG. 6, and FIG. 7A to FIG. 7C, the front-end DC conversion path includes an energy-storing inductor $L_4$, a first switch $Q_7$, and a second switch $Q_8$. A first end of the energy-storing inductor $L_4$ is coupled to a common-connected node of the first switch $Q_7$ and the second switch $Q_8$, and a second end of the energy-storing inductor $L_4$ is coupled to the battery 30.

Figure 7B:
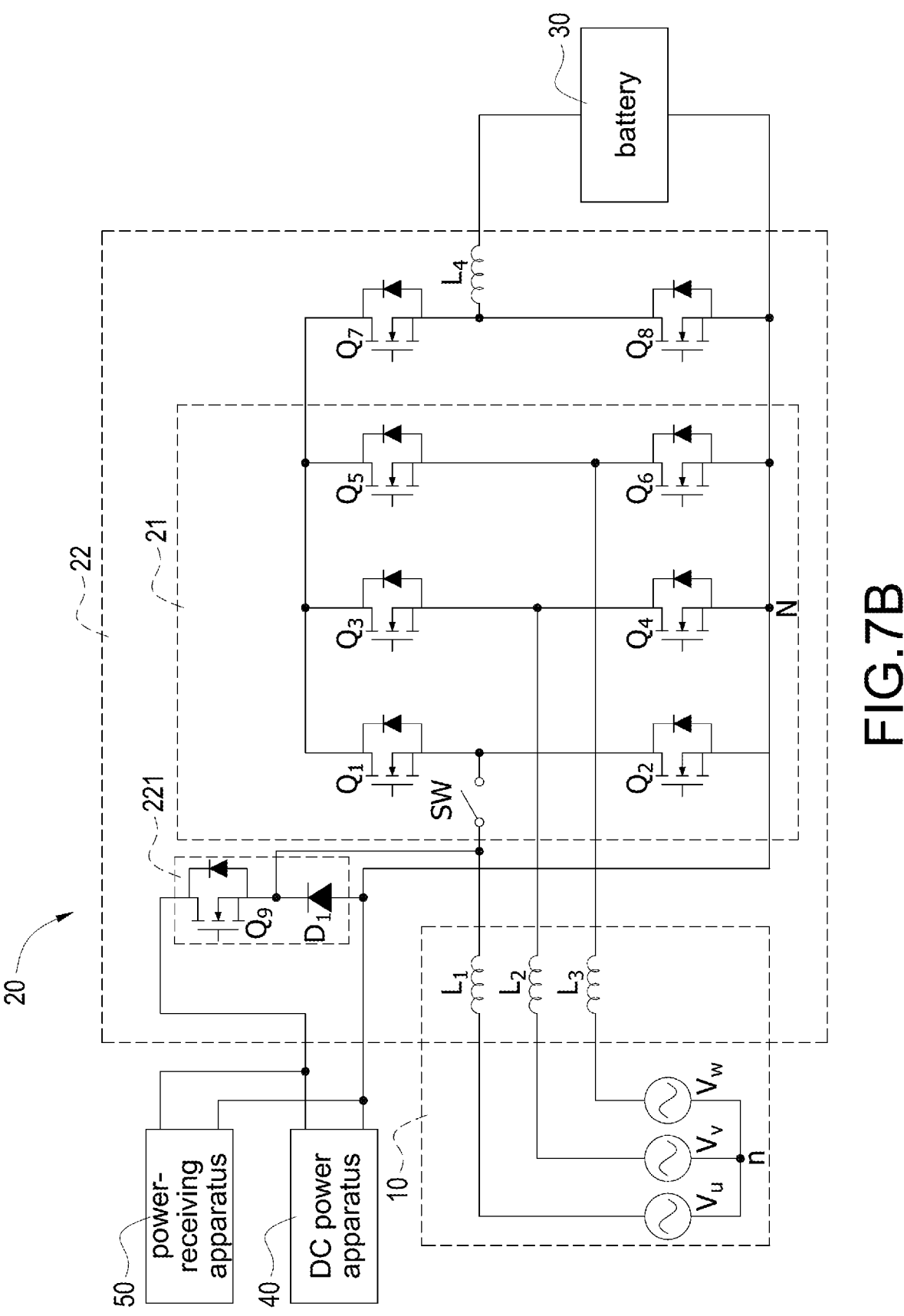
FIG. 7B is a block circuit diagram of FIG. 7A according to a first embodiment of the present disclosure.

Specifically, in the first embodiment shown in FIG. 7B, the number of switch SW is one, and therefore one sub path 221 is corresponding to the switch SW. The sub path 221 is coupled between the DC power apparatus 40 and the switch SW. However, the above-mentioned sub path 221 is not limited to be coupled to the first bridge arm, that is, the sub path 221 may be coupled to any one bridge arm, and the switch SW is coupled correspondingly between the bridge arm and the inductor $L_1$, $L_2$, $L_3$.

Figure 7C:
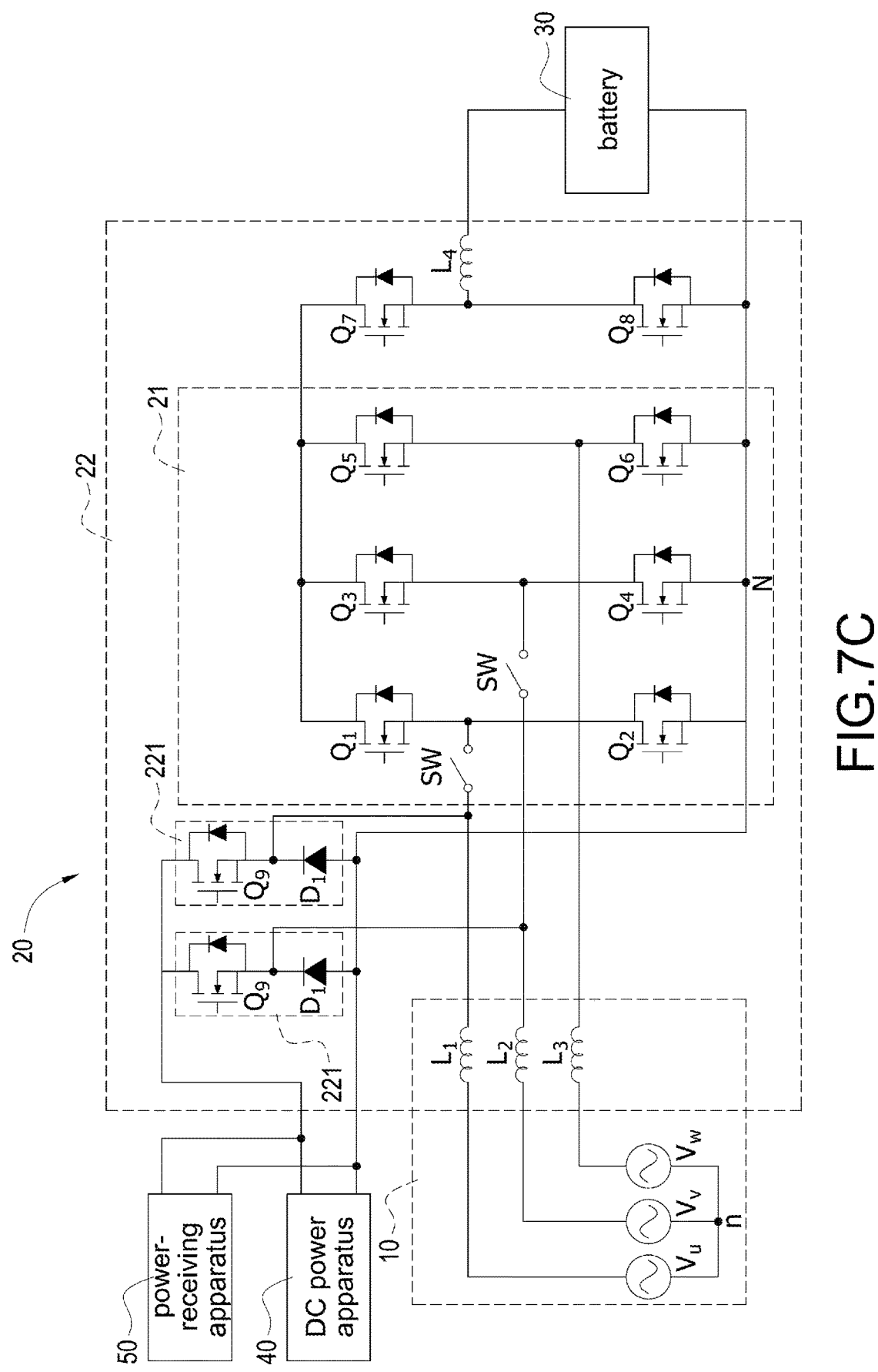
FIG. 7C is a block circuit diagram of FIG. 7A according to a second embodiment of the present disclosure.

Specifically, in the second embodiment shown in FIG. 7C, the number of switches SW is two, and therefore two sub paths 221 are corresponding to the two switches SW. The first sub path 221 is coupled between the DC power apparatus 40 and the first switch SW, and the second sub path 221 is coupled between the DC power apparatus 40 and the second switch SW. The first switch SW is coupled between the first bridge arm, which includes the upper switch $Q_1$ and the lower switch $Q_2$, and the first inductor $L_1$, and the second switch SW is coupled between the second bridge arm, which includes the upper switch $Q_3$ and the lower switch $Q_4$, and the second inductor $L_2$. However, the above-mentioned two sub paths 221 are not limited to be coupled to the first bridge arm and the second bridge arm, that is, the two sub paths 221 may be coupled to any two bridge arms, and the two switches SW are coupled correspondingly between the bridge arms and the inductors $L_1$, $L_2$, $L_3$.

For the circuits shown in the previous disclosure, when a voltage of the battery 30 is greater than a reference voltage value, the charger 22 operates in a boost (step-up) mode to charge the battery 30, and when the voltage of the battery 30 is less than the reference voltage value, the charger 22 operates in a buck (step-down) mode to charge the battery 30. Moreover, the battery 30 provides power required by the power-receiving apparatus 50 through the charger 22, or the power-receiving apparatus 50 charges the battery 30 through the charger 22. Moreover, according to the power required by the power-receiving apparatus 50, the charger 22 makes the battery 30 operate in a boost (step-up) mode or a buck (step-down) mode to discharge to the power-receiving apparatus 50. However, the circuits shown in FIG. 3A, FIG. 3B, and FIG. 6, the DC power apparatus 40 or the power-receiving apparatus 50 operate in a boost mode to charge the battery 30, and the charger 22 makes the battery 30 operate in a buck (step-down) mode to discharge to the power-receiving apparatus 50.

Accordingly, the power integration system with motor drive and battery charging and discharging function is provided to realize the structure that the power switches of a three-phase motor driver are shared in the charger, which can reduce the number of external components, thereby reducing the size and achieving high efficiency.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power integration system with motor drive and battery charging and discharging function, comprising:
   a motor, comprising multi-phase paths, each path comprising an inductor;
   a power integration circuit, comprising:
   an inverter, comprising multi-phase bridge arms, each of said bridge arms comprising an upper switch and a lower switch, and each of said bridge arms correspondingly coupled to each inductor of the motor; and
   a charger, comprising a switch, and sharing the upper switch and the lower switch of at least one bridge arm of said bridge arms of the inverter and at least one inductor of said inductors of the motor for performing the battery charging and discharging function, wherein the switch is coupled between any two bridge arms; and
   a battery, coupled to the power integration circuit,
   wherein when the power integration circuit receives a DC power provided by a DC power apparatus, the switch of the charger is turned off for charging the battery; when a voltage of the battery is greater than a reference voltage value, the charger operates in a boost mode for converting the DC power to charge the battery; and when the voltage of the battery is less than the reference voltage value, the charger operates in a buck mode for converting the DC power to charge the battery, wherein when the battery provides power to a power-receiving apparatus, the switch of the charger is turned off and the charger operates in the boost mode or in the buck mode for the battery to provide power to the power-receiving apparatus, and wherein the switch of the charger is turned on for the battery to provide power required to drive the motor through the inverter.

2. The power integration system as claimed in claim 1, wherein the charger further comprises a front-end DC conversion path, coupled to the upper switch and the lower switch of the at least one bridge arm of the inverter shared by the charger for performing the battery charging and discharging function.

3. A power integration system with motor drive and battery charging and discharging function, comprising:

a motor, comprising multi-phase paths, each path comprising an inductor;

a power integration circuit, comprising:

an inverter, comprising multi-phase bridge arms, each of said bridge arms comprising an upper switch and a lower switch, and each of said bridge arms correspondingly coupled to each inductor of the motor; and a charger, comprising a switch, and sharing the upper switch and the lower switch of at least one bridge arm of said bridge arms of the inverter and at least one inductor of said inductors of the motor for performing the battery charging and discharging function; and a battery, coupled to the power integration circuit, wherein when the power integration circuit receives a DC power provided by a DC power apparatus, the switch of the charger is turned off for charging the battery; when a voltage of the battery is greater than a reference voltage value, the charger operates in a boost mode for converting the DC power to charge the battery, and when the voltage of the battery is less than the reference voltage value, the charger operates in a buck mode for converting the DC power to charge the battery, wherein the battery provides power to a power-receiving apparatus, the switch of the charger is turned off and the charger operates in the boost mode or in the buck mode for the battery to provide power to the power-receiving apparatus, wherein the switch of the charger is turned on for the battery to provide power required to drive the motor through the inverter, and wherein the switch is coupled between any one of said inductors of the motor and the DC power apparatus.

4. The power integration system as claimed in claim 3, wherein the charger further comprises a front-end DC conversion path, coupled to the upper switch and the lower switch of the at least one bridge arm of the inverter shared by the charger for performing the battery charging and discharging function.

5. A power integration system with motor drive and battery charging and discharging function, comprising:

a motor, comprising multi-phase paths, each path comprising an inductor;

a power integration circuit, comprising:

an inverter, comprising multi-phase bridge arms, each of said bridge arms comprising an upper switch and a lower switch, and each of said bridge arms correspondingly coupled to each inductor of the motor; and a charger, comprising a switch and a sub path, and sharing the upper switch and the lower switch of at least one bridge arm of said bridge arms of the inverter and at least one inductor of said inductors of the motor for performing the battery charging and discharging function, wherein the switch is coupled between any one of said bridge arms of the inverter and the corresponding inductor of the motor; and a battery, coupled to the power integration circuit, wherein when the power integration circuit receives a DC power provided by a DC power apparatus, the switch of the charger is turned off for charging the battery; when a voltage of the battery is greater than a reference voltage value, the charger operates in a boost mode for converting the DC power to charge the battery, and when the voltage of the battery is less than the reference voltage value, the charger operates in a buck mode for converting the DC power to charge the battery, wherein the battery provides power to a power-receiving apparatus, the switch of the charger is turned off and the charger operates in the boost mode or in the buck mode for the battery to provide power to the power-receiving apparatus, wherein the switch of the charger is turned on for the battery to provide power required to drive the motor through the inverter, and wherein the sub path is coupled to the switch, the DC power apparatus and the power-receiving apparatus.

6. The power integration system as claimed in claim 5, wherein the charger further comprises a front-end DC conversion path, coupled to the upper switch and the lower switch of the at least one bridge arm of the inverter shared by the charger for performing the battery charging and discharging function.

7. The power integration system as claimed in claim 5, wherein the sub path comprises a third switch and a first diode, and a common-connected node of the third switch and the first diode is coupled to the switch of the charger.

8. The power integration system as claimed in claim 5, wherein the sub path comprises a third switch and a fourth switch, and a common-connected node of the third switch and the fourth switch is coupled to the switch of the charger.

* * * * *